United States Patent
Geagan, III et al.

(10) Patent No.: US 9,537,652 B2
(45) Date of Patent: Jan. 3, 2017

(54) POLYMORPHIC ENCRYPTION KEY ALLOCATION SCHEME

(71) Applicant: INTERNATIONAL BUSINESS MACHINES CORPORATION, Armonk, NY (US)

(72) Inventors: John B. Geagan, III, San Jose, CA (US); Dulce B. Ponceleon, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/671,314

(22) Filed: Mar. 27, 2015

(65) Prior Publication Data

US 2016/0285622 A1  Sep. 29, 2016

(51) Int. Cl.
  *H04K 1/00*    (2006.01)
  *H04L 9/06*    (2006.01)
  *H04L 9/08*    (2006.01)

(52) U.S. Cl.
  CPC .......... *H04L 9/0618* (2013.01); *H04L 9/0816* (2013.01); *H04L 2209/24* (2013.01); *H04L 2209/34* (2013.01)

(58) Field of Classification Search
  CPC .. H04L 9/0618; H04L 9/0816; H04L 2209/24; H04L 2209/34
  See application file for complete search history.

(56) References Cited

U.S. PATENT DOCUMENTS

| | | | |
|---|---|---|---|
| 2007/0079118 A1 | 4/2007 | Chmora et al. | |
| 2007/0140480 A1* | 6/2007 | Yao | H04L 9/0822 380/30 |
| 2009/0323970 A1 | 12/2009 | Cerruti et al. | |
| 2011/0026710 A1 | 2/2011 | Lotspiech | |
| 2012/0128152 A1 | 5/2012 | Rutkowski | |

(Continued)

OTHER PUBLICATIONS

Geagan, J. et al., "Once Upon a Time, I Bought a Movie and it Played Everywhere in My Home Categories and Subject Descriptors," Dec. 1, 2011; XP055279991.

(Continued)

*Primary Examiner* — Mohammed Waliullah
(74) *Attorney, Agent, or Firm* — Erik Huestis; Stephen Kenny; Foley Hoag LLP (57) ABSTRACT

Embodiments of the present invention relate to encryption key allocation with additional security elements to lessen vulnerability to certain attacks. In one embodiment, a method and computer program product is provided for broadcast encryption. A key bundle encoded in a non-transient machine-readable medium is received. The key bundle comprises a first cryptographic key and an associated first cryptographic function identifier. Encrypted content is received. A key block corresponding to a subset difference tree is received. A first cryptographic triple function corresponding to the first cryptographic function identifier is determined. The subset difference tree is traversed using the first cryptographic key and the first cryptographic triple function to obtain a content cryptographic key. The content cryptographic key is applied to the encrypted content to obtain decrypted content.

14 Claims, 3 Drawing Sheets

(56) References Cited

U.S. PATENT DOCUMENTS

| | | | |
|---|---|---|---|
| 2012/0243687 A1* | 9/2012 | Li | H04L 9/085 380/277 |
| 2014/0068260 A1* | 3/2014 | Oney | H04L 63/045 713/168 |
| 2014/0173763 A1* | 6/2014 | Svidenko | G11B 20/0021 726/32 |

OTHER PUBLICATIONS

Jiang Bian et al: "A role-based secure group communication framework," System of Systems Engineering, 2008. SOSE '08. IEEE International Conference on, IEEE, Piscataway, NJ, USA, Jun. 2, 2008; pp. 1-6, ISBN: 978-1-4244-2172-5.

* cited by examiner

| Key | Function |
| --- | --- |
| 0x0f6213fc253e53c1e7af71ad3cf0fc65 | AES-G3 |
| 0x22afbe702aaf6122483aca8e8b6d0581 | AES-G3 |
| 0x460b3afbcc14d40cb5b8e69ef7ab927c | AES-G3 |
| 0x31cb2506bdbc19fcb30135392aac26ae | AES-G3 |
| 0x5170421a1362dac1da77db7d06f2d439 | AES-G3 |
| 0x9edbf64adcafceab0477f0e172f9744c | AES-G3 |
| 0xd324c83e84810ec5fd0c7cd08eb43bcf | AES-G3 |

POLYMORPHIC ENCRYPTION KEY ALLOCATION SCHEME

BACKGROUND

Embodiments of the present invention relate to broadcast encryption, and more specifically, to encryption key allocation with additional security elements to lessen vulnerability to certain attacks.

BRIEF SUMMARY

According to one embodiment of the present invention, a method and computer program product is provided for broadcast encryption. A key bundle encoded in a non-transient machine-readable medium is received. The key bundle comprises a first cryptographic key and an associated first cryptographic function identifier. Encrypted content is received. A key block corresponding to a subset difference tree is received. A first cryptographic triple function corresponding to the first cryptographic function identifier is determined. The subset difference tree is traversed using the first cryptographic key and the first cryptographic triple function to obtain a content cryptographic key. The content cryptographic key is applied to the encrypted content to obtain decrypted content.

According to another embodiment of the present invention, a method and computer program product for broadcast encryption is provided. A key bundle encoded in a non-transient machine-readable medium is provided. The key bundle comprises a first cryptographic key and an associated first cryptographic function identifier. Encrypted content is provided. A key block corresponding to a subset difference tree is provided. The key block is selected such that the encrypted content is decryptable by: determining a first cryptographic triple function corresponding to the first cryptographic function identifier; traversing the subset difference tree using the first cryptographic key and the first cryptographic triple function to obtain a content cryptographic key; and applying the content cryptographic key to the encrypted content to obtain decrypted content.

According to another embodiment of the invention, a method and computer program product for key allocation is provided. The allocated keyspace of a subset difference tree is determined. The allocated keyspace is traversable by a set of cryptographic triple functions. An unused key of the subset difference tree is selected. A traversal function that is not contained in the set of cryptographic triple functions is selected. A key bundle encoded in a non-transient machine-readable medium is provided. The key bundle comprises the unused key and an identifier identifying the traversal function.

DETAILED DESCRIPTION

A subset difference tree approach may be used in a broadcast encryption scheme to restrict authorized access to distributed content. NNL (named for Naor, Naor, and Lotspiech) provides space-efficient Key Allocations in Broadcast Encryption systems utilizing a subset difference tree. NNL uses a one-way triple function to traverse downwards through a binary tree and derive encryption keys from parent nodes, where application of the triple function allows determination of a processing key as well as left and right children of the node. Content consumers are allocated a unique small set of labels (keys) for specific starting nodes, and by applying the triple function, are able to derive any other labels and keys beneath (covered by) those starting labels. This ability to derive labels from other labels gives NNL its compactness, and in particular allows the distribution of a minimal set of keys to a client. Similarly, NNL enables the distribution of a minimal set of encryptions. Rather than distributing a version of a message encrypted for each target device, messages may be encrypted for subsets of devices using the subset difference tree approach.

A single predetermined one-way function may be applied to traverse the tree. Where this function is known in advance, an attacker may be able derive additional keys through brute force. In particular, the result of a known one-way function may be computed for all possible inputs. Once an answer matches any starting label, the one-way function has been broken, and an attacker has derived a label that she was not authorized to have. With sufficient computing power, an attacker may thereby circumvent the content protection system. The result of a successful brute force attack is potentially disastrous, as derivation of unauthorized labels would allow an attacker to impersonate any other authorized content consumer to obtain unauthorized access to content. An efficient attack may be mounted in which answers are compared to the entire set of starting labels in parallel. Comparison of one label to each computed answer is not significantly easier than comparing several labels at the same time. If an attacker has multiple sets of starting labels (e.g., multiple compromised keysets) then this parallelism is increased further. Once any label has been cracked, all keys under that label may be easily derived using a known triple function. Even the method (other than pure random number generation) used to derive the starting labels would be at risk of cracking as well.

To minimize the risk of such an attack, the one-way function may be chosen so that a brute force attack is infeasible. In particular, a function may be chosen that will require a prohibitive amount of time to crack through brute force. For example, a one-way function that uses AES-128 is generally believed to be impossible to crack at this time. However, attackers have access to increasingly large clouds (or botnets) comprising multiple computers whose average individual computation power is doubling every 18 months. With the ongoing increase in computing power, attackers can crack by brute force approximately one more bit of encryption strength each year. In addition, there are occasional technological (hardware or algorithmic) developments which allow orders-of-magnitude leaps in cracking efficiency (e.g., rainbow tables, CPU support for AES, multi-core parallelism, massive parallelism in GPUs, FPGAs, quantum computing). Given these ongoing advances, a one-way function that cannot be practically cracked at present may be cracked in the near future.

To address the risk of a brute force attack in broadcast encryption, the present disclosure provides for variation of the encryption function applicable to individual labels in the matrix. When the encryption function varies within a broadcast encryption system, an effective brute force attack cannot be launched. Even where it is possible to brute force a single known function, it is not possible to perform a brute force attack where the applicable encryption function is unknown. In addition, by allowing the encryption function to vary, key lengths (and therefore the size of the decryption key bundle) may be decreased while maintaining the same effective encryption strength.

Figure 1:
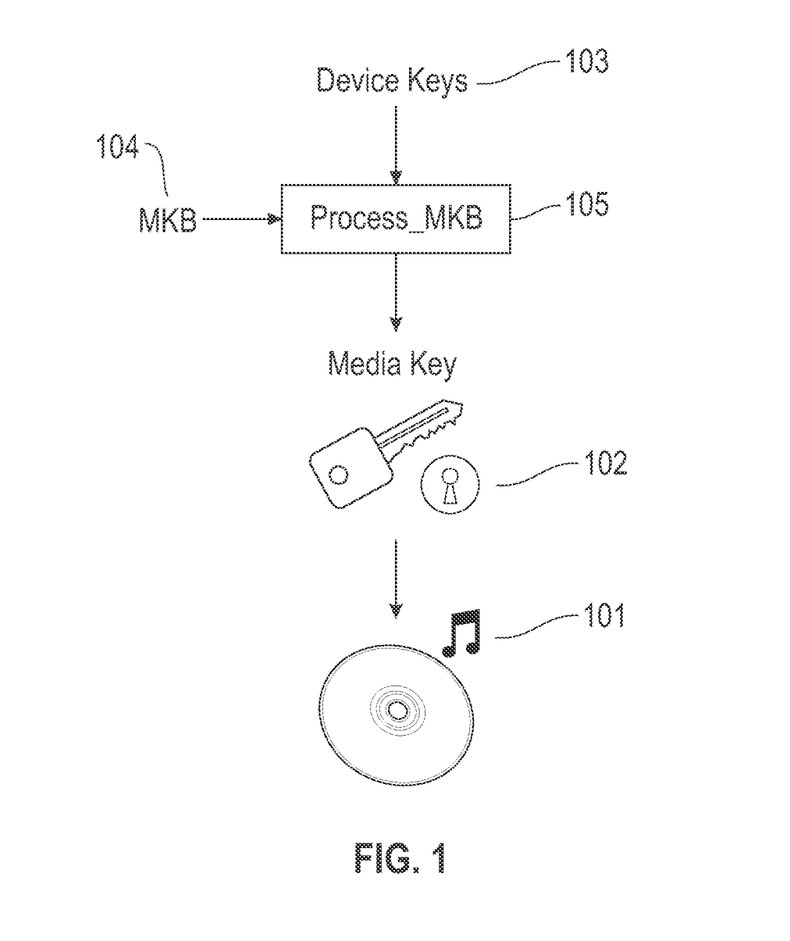
FIG. 1 is a schematic representation of a broadcast encryption scheme according to an embodiment of the present disclosure.

Referring to FIG. 1, a schematic representation of a broadcast encryption scheme is provided. In general, encrypted content 101 is encrypted with media key 102. Media Key ($K_m$) 102 is determined by an authorized content consumer by processing a Media Key Block (MKB) 104 using a set of Device Keys ($K_d$) 103. Media Key 102 is specific to the encrypted content, Device Keys 103 are included in an authorized content consumer (such as a digital media player), and Media Key Block 104 is included with the encrypted content, for instance in the lead-in area of optical media such as a DVD.

In such a broadcast encryption scheme, a Key Generation Facility (KGF) is responsible for generating a plurality of encryption keys, including Media Keys 102 and Device Keys 103. The Key Generation Facility is also responsible for generating a Media Key Block 104 from which a given Media Key 102 may be derived by an authorized content consumer.

Encrypted content is encrypted using a unique Media Key 102 prior to distribution, whether via a network or on optical media such as a DVD. In conjunction with the encrypted content, the appropriate Media Key Block 102 is provided. In some embodiments, the Media Key Block 104 is located on optical media with the encrypted content 101. In other embodiments, the Media Key Block 104 is distributed over a network before, after, or during distribution of the encrypted content. In some embodiments, the encrypted content and the Media Key Block 104 are distributed via different mechanisms, while in some embodiments they are distributed through the same mechanism.

An authorized consumer of the encrypted content, such as a media player, is provided with a bundle of Device Keys ($K_d$) 103. By processing 105 the Media Key Block (MKB) 104 with its Device Keys 103, the authorized player is able to determine the Media Key ($K_m$) 102. The Media Key ($K_m$) 102 is then used to decrypt the encrypted content 101. One of skill in the art would recognize that several methods are known for processing a Media Key Block 104 to obtain a Media Key 102, such as those practiced in AACS.

The Key Generation Facility furnishes different authorized content consumers, or groups of consumers, different bundles of Device Keys. The Media Key Block is generated by the Key Generation Facility so that only authorized Device Keys are able to determine a given Media Key from the Media Key Block. If a given consumer or media player is no longer authorized to consume the encrypted content, then subsequent Media Key Blocks generated by the Key Generation Facility will not enable such revoked players to obtain the Media Key. In this way, a revoked consumer will be unable to decrypt content provided after its revocation.

In a subset-difference approached such as that adopted by AACS, the keyspace is defined by a large master tree of keys. Each authorized device is uniquely associated with a leaf node of the key tree. The bundle of device keys 103 for each device contains exactly one unique leaf key. The remaining device keys in bundle 103 are sufficient to derive every other key in the tree except the set of keys lying between the device's leaf key and the tree root. As noted above, each child key is computable from its parent key by application of a one-way function. So, a content consumer in possession of a given set of device keys cannot derive its own leaf key. However, any other content consumer with another device key bundle may.

Corresponding to every sub-tree in the master tree is a separate tree of keys supplemental to the master tree. For example, one level down from the root of the master binary tree there are two sub-trees, each with its own associated tree of keys. Consequently, at the bottom of the master tree, each pair of device-associated leaf nodes belongs to its own sub-tree of height 1. For each sub-tree corresponding to a node in the master tree between a given device's associated leaf node and the tree root, the device's set of device keys enables derivation of every key in that sub-tree except the keys between its leaf and the root within that sub-tree.

Using this relationship between keys, any leaf key may be revoked by including in the Media Key Block the Media Key encrypted only by that leaf nodes that is revoked. To revoke a continuous range of leaf keys, the Media Key may be encrypted by a key located higher in the master tree. Non-contiguous ranges of leaf keys may be revoked through use of the sub-tree system. A key associated with a single contiguous group of revoked Leaf Keys in a single sub-tree is used to encrypt the Media Key. This entry in the MKB allows devices that do not have that key to successfully compute the Media Key while preventing all devices containing the revoked leaf keys from successfully computing the Media Key. A similar encryption is repeated with other sub-trees, until all devices containing the revoked leaf keys are unable to compute the Media Key and all other devices can.

Figure 2:
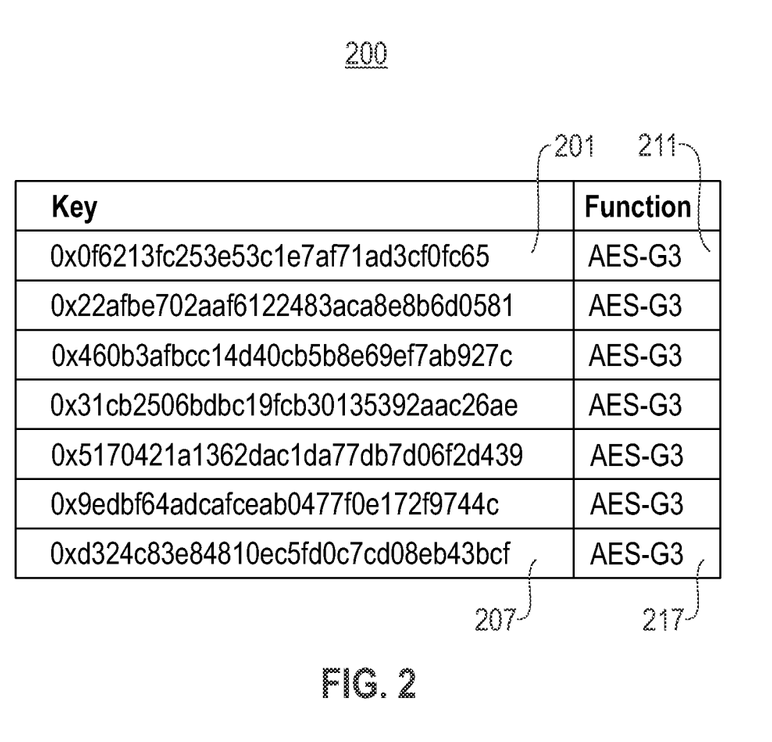
FIG. 2 is an exemplary device key bundle according to an embodiment of the present disclosure.

FIG. 2 depicts an exemplary Device Key Bundle according to an embodiment of the present disclosure. Device Key Bundle 200 includes multiple entries (depicted as rows), each comprising a key 201 . . . 207. In some embodiments, the keys 201 . . . 207 are 128 bit (16 byte) AES keys, function identifiers 211 . . . 217 are omitted, and the applicable function is known to an authorized content consumer a priori. In such embodiments, the triple function may be AES-G3 as defined by AACS. In some embodiments, an alternative block cipher is used. Various ciphers and corresponding key lengths may be used, including but not limited to AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

In some embodiments, each entry in Device Key Bundle 200 includes a function identifier 211 . . . 217. Function identifiers 211 . . . 217 indicate which cryptographic function is applicable to each of keys 201 . . . 207. In some embodiments, function identifiers 211 . . . 217 are salts to a known cryptographic function, (i.e., a random value that provides an additional input to the cryptographic function). In some embodiments, function identifiers 211 . . . 217 include both an indication of the function to be applied and a salt value. In some embodiments, function identifiers 211 . . . 217 include information sufficient to derive a function or a salt value. For example, function identifiers 211 . . . 217 may include a seed to a pseudorandom number generator that is then used to generate a salt value or other parameter to a cryptographic function. In some embodiments, function identifier 211 . . . 217 includes a description of the cryptographic function to be applied, encoded in a language suitable for encoding of mathematical functions, such as MathML. In some embodiments, instead of associating a given function directly with a key, an algorithmic mapping is provided such that a content consumer may derive the appropriate function from a position in the tree.

In some embodiments, function identifiers 211 . . . 217 may each be one of multiple possible triple functions. A given content consumer is given only those function identifiers that are required to traverse the tree from its assigned starting points. No identifiers are included for those nodes and sub-trees located above the consumer's starting labels. Because the information included in the device key bundle, an attacker will not know which one-way function is used to derive any of its given starting labels. An attacker will not be able to mount an effective brute force attack on an unknown function. Even if an attacker gets a matching answer for some function, she will not know if that was the correct function to start with. Even an accurate guess as to the correct function for a given key will not provide an attacker with information regarding the function necessary to traverse the tree into unauthorized sub-trees. Thus, application of the key allocation scheme of the present disclosure effectively precludes brute force attacks directed to obtaining unknown keys.

In some embodiments, the traversal functions are not defined for areas of the tree that have not yet been traversed. For example, areas of the tree that have not yet been assigned to authorized content consumers by the Key Generation Facility and have also not been used to specify decryption subsets may be left undefined until actually used. Leaving large areas of the tree undefined until the moment that they are first used allows deferred assignment of traversal functions. Consequently, alternative encryption functions, whether currently known or as yet undeveloped, may be applied to an existing scheme in the future. Deferring function definition may be applied retroactively to existing subset difference schemes, even after deployment. For example, the function may be changed for unused spaces in a pre-existing NNL system such as AACS without affecting existing content and consumers. In effect, only the allocated areas are locked into using a given traversal functions. The vast majority of the space in NNL systems already deployed is still unused, so the techniques of the present disclosure may be deployed widely in existing systems without compromising backwards compatibility. In some embodiments the content provider does know all of the functions applied in extant media key blocks in order to generate future keys. However, in some embodiments, additional functions may be added to the existing system by modifying the content provider without rendering existing content inaccessible. In some embodiments, different content providers are allocated different functions. In some embodiments, the functions in use are known to a forensics system, which may be used to detect compromised keys.

Furthermore, because some of the effective encryption strength of the broadcast encryption system can be relocated to polymorphic traversal functions, the strength of a key of a given length is greatly increased. In general, the protection of unknown keys is more important than protection of individual content (or a single message). Therefore, the size of the starting keys may be reduced. For example, the strength of the encryption applied may be selected to protect individual content for its useful lifetime (even if that is only a few hours or days). The result is that the aggregated decryption key bundle size may be significantly reduced. In some implementations, the decryption key bundle size may be reduced by half or more. In some embodiments, the decryption key bundle is coupled with a broadcast content transmission (as opposed to being included in one-time static key and function storage in the clients). In such embodiments, the ongoing transmission overhead is significantly reduced through the use of polymorphic traversal functions.

In some embodiments, the traversal function of each node is unique. In such an embodiment, the space required for static key storage on the receiving side is comparable to the space required to give out the full set of derived keys. Notwithstanding the increased receiver side static key storage in such an embodiment, the decryption key bundle or Media Key Block would remain small. The number of unique traversal functions applied in the tree may be varied from one (a purely monomorphic approach) to one per node (a purely polymorphic approach).

In some embodiments, there is variation of the traversal function only as to certain portions of the subset difference tree. In one exemplary embodiment, a default function is known to the content consumer in advance. However, the first branches of the tree from each starting label a triple function other than the default. Such a zero space cost technique protects the labels, as well as half of the keyspace. In another exemplary embodiment, the same function is used over large areas of the tree space. In some embodiments, each adopter of the encryption scheme is assigned a unique function. In another exemplary embodiment, a single function is used throughout the keyspace, but the function includes at least one unique constant. In some embodiments, many different functions are used in combination with many different parameters in order to derive larger derived constants. In some embodiments, variable-sized constants are used. In some embodiments, each level of the tree has a fixed number of different functions. In some embodiments, the triple function is varied sporadically throughout the tree. For example, approximately $\frac{1}{10}$th of the nodes may at random have a function different from a default. In some embodiments, the proportion of such spot transitions may be tuned to adjust the space requirements on content consumers. Finally, the mere possibility that the triple function varies may act as a deterrent to a potential attacker without in fact requiring variation of the function.

Figure 3:
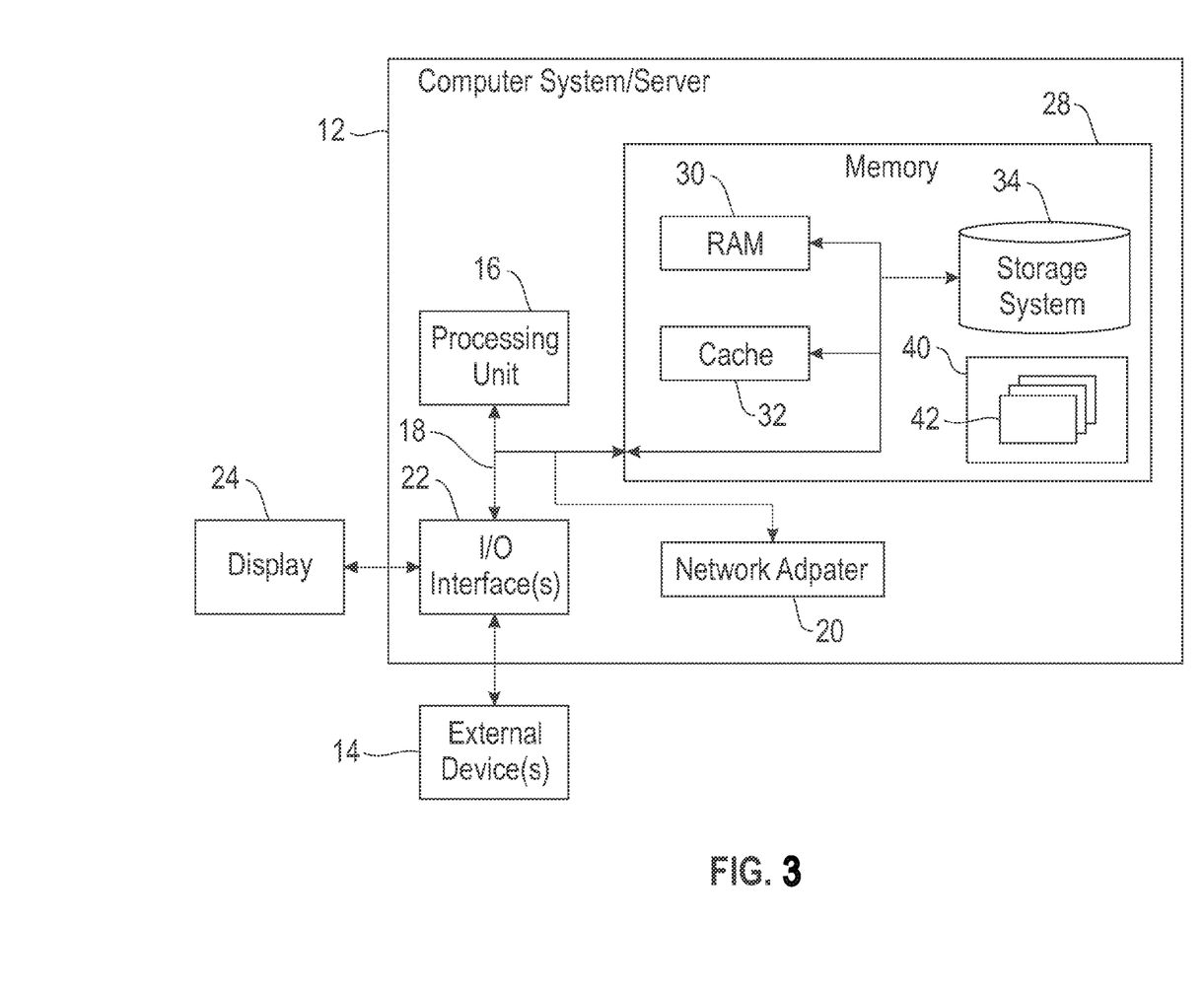
FIG. 3 depicts a computing node according to an embodiment of the present invention.

Referring now to FIG. 3, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by a hardware processor, a key bundle encoded in a non-transitory machine-readable medium, the key bundle comprising a first cryptographic key and an associated first cryptographic function identifier, the first cryptographic function identifier identifying a first cryptographic triple function and providing description of the first cryptographic function sufficient to derive the first cryptographic function;
    receiving, by the hardware processor, encrypted content;
    receiving, by the hardware processor, a key block corresponding to a subset difference tree;
    determining, by the hardware processor, the first cryptographic triple function corresponding to the first cryptographic function identifier using at least the first cryptographic function identifier;
    traversing, by the hardware processor, the subset difference tree using the first cryptographic key and the first cryptographic triple function to obtain a content cryptographic key;
    applying, by the hardware processor, the content cryptographic key to the encrypted content to obtain decrypted content.

2. The method of claim 1, wherein the decrypted content comprises multimedia data.

3. The method of claim 1, wherein the first cryptographic function identifier comprises a salt value.

4. The method of claim 1, wherein the first cryptographic function identifier comprises a random seed.

5. The method of claim 1, wherein the first cryptographic triple function comprises a block cipher.

6. The method of claim 5, wherein the block cipher is selected from the group consisting of: AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

7. The method of claim 1, wherein the key bundle comprises a second cryptographic key and an associated second cryptographic function identifier and wherein traversing the subset difference tree comprises:
    determining a second cryptographic triple function corresponding to the second cryptographic function identifier;
    traversing a sub-tree of the subset difference tree using the second cryptographic triple function.

8. A method comprising:
providing a key bundle encoded in a non-transitory machine-readable medium, the key bundle comprising a first cryptographic key and an associated first cryptographic function identifier, the first cryptographic function identifier identifying a first cryptographic triple function and providing description of the first cryptographic function sufficient to derive the first cryptographic function;
providing encrypted content
providing a key block corresponding to a subset difference tree, wherein the key block is selected for decrypting the encrypted content by:
- determining, by a hardware processor, the first cryptographic triple function corresponding to the first cryptographic function identifier using at least the first cryptographic function identifier;
- traversing, by the hardware processor, the subset difference tree using the first cryptographic key and the first cryptographic triple function to obtain a content cryptographic key;
- applying, by the hardware processor, the content cryptographic key to the encrypted content to obtain decrypted content.

9. The method of claim 8, wherein the encrypted content comprises multimedia data.

10. The method of claim 8, wherein the first cryptographic function identifier comprises a salt value.

11. The method of claim 8, wherein the first cryptographic function identifier comprises a random seed.

12. The method of claim 8, wherein the first cryptographic triple function comprises a block cipher.

13. The method of claim 12, wherein the block cipher is selected from the group consisting of: AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA.

14. The method of claim 8, wherein the key bundle comprises a second cryptographic key and an associated second cryptographic function identifier and wherein traversing the subset difference tree comprises:
- determining a second cryptographic triple function corresponding to the second cryptographic function identifier;
- traversing a sub-tree of the subset difference tree using the second cryptographic triple function.

* * * * *